Figure 1:
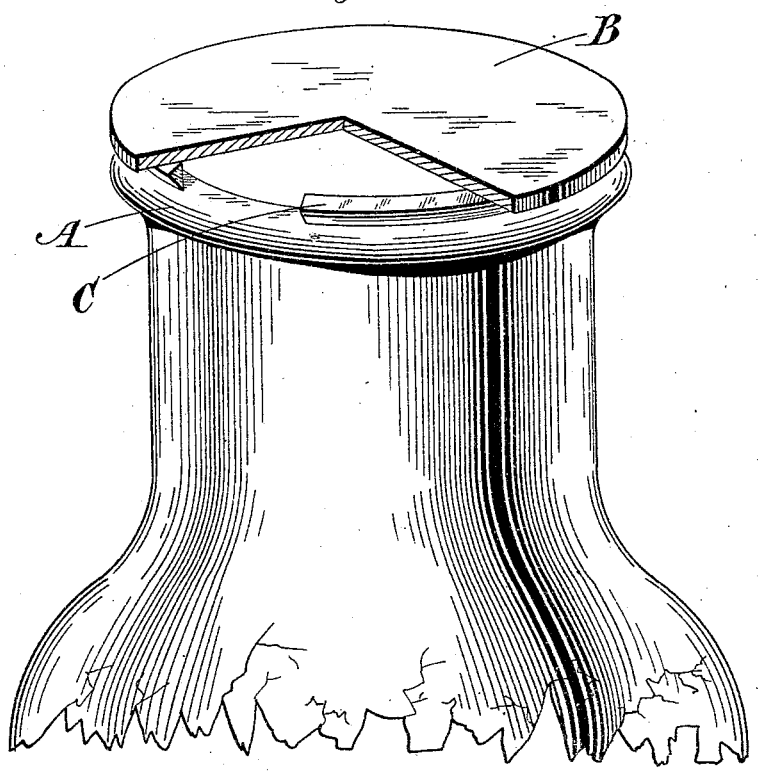

No. 884,378. PATENTED APR. 14, 1908.
C. H. GRAY.
CLOSING DEVICE FOR AIR TIGHT BOTTLES, JARS, AND OTHER RECEPTACLES.
APPLICATION FILED MAY 7, 1907.

Witnesses:
B. C. Rust
J. J. McCarthy

Inventor
C. H. Gray
by Foster Freeman Watson & Cort
Attorney

UNITED STATES PATENT OFFICE.

CHRISTIAN HAMILTON GRAY, OF SILVERTON, ENGLAND.

CLOSING DEVICE FOR AIR-TIGHT BOTTLES, JARS, AND OTHER RECEPTACLES.

No. 884,378.  Specification of Letters Patent.  Patented April 14, 1908.

Application filed May 7, 1907. Serial No. 372,395.

*To all whom it may concern:*

Be it known that I, CHRISTIAN HAMILTON GRAY, a subject of the King of England, residing at Silverton, in Essex, England, have invented certain new and useful Improvements in Closing Devices for Air-Tight Bottles, Jars, and other Receptacles, of which the following is a specification.

This invention relates to improvements in closing devices for air-tight bottles, jars and other receptacles, such for example as are employed for the preservation of food.

Hitherto in hermetically sealing a vessel it has been customary to employ between the lid and the vessel a ring of indiarubber of rectangular or circular cross-section, and when the pressure within the vessel is reduced, either by cooling its gaseous contents or otherwise, the external atmospheric pressure forces the lid down on to the rubber ring and creates a joint; but with rubber rings of this description, it has been found necessary to employ easily deformable and therefore expensive qualities of rubber.

The object of the present invention is to improve closing devices of this general type.

According to this invention I employ a ring of resilient or deformable elastic material such as indiarubber which presents an attenuated edge or ridge to each surface with which it comes in contact, and such edge, ridge, or attenuated portion being more readily deformable than a rectangular or circular body of rubber, affords a more uniform contact all round the ring, so that when the pressure within the vessel is reduced either by cooling its gaseous contents or otherwise it may act in the manner of a knife-edge joint.

In fluid-pressure joints where the deformation of a resilient packing ring is caused by the difference of pressure inside and outside the receptacle, it is desirable that the contact between the packing ring and the joining surfaces should be uniform and complete even before the difference of pressure is set up, and by providing an edge, ridge, or easily deformable portion on the ring where it touches the joining surfaces, this preliminary contact is most effective as the weight of the lid or the like is sufficient to insure close contact with the ring all round.

It is desirable that the attenuated portions presented to the joining surface should not form into loops or kinks which would tend to produce apertures or spoil the joint and to prevent this the attenuated portions or edges according to this invention taper out to a wider body of resilient material, so that the ring in cross-section has a wide body of rubber or the like at the middle and is inclined, curved or cut away to form the necessary attenuated portions where it touches the joining surfaces.

In one form of packing ring embodying this invention, the cross-section is triangular, with one face (either the inner or outer face) at right angles to the two joining surfaces and the other two faces not in contact with the said surfaces, so that two edges of the ring are presented to the joining surfaces. Again, the ring may be square or polygonal, but in each case so formed that edges or attenuated portions are presented to the surfaces while the ring increases in width from the contact points. The preferable forms of ring in accordance with this invention are those which in section are either triangular, square, or in the form of a parallelogram in each case with the sharp edges directed towards the contact surfaces. The particular advantage with these three forms is that they can be readily produced without any waste of material. Packing rings constructed as above described need not be of expensive rubber and may therefore be considerably cheaper than those at present employed.

Figure 2:
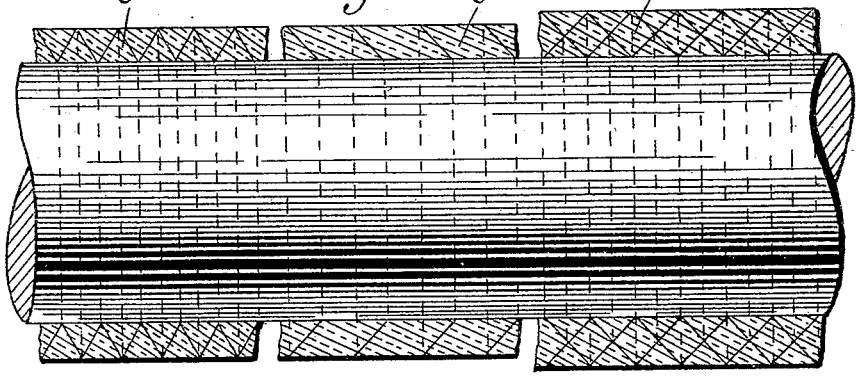

In the accompanying drawings:—Figure 1 illustrates the employment of one form of packing ring embodying this invention, and Fig. 2 illustrates various methods of cutting these rings from indiarubber tubes.

A is the rim of the vessel to be hermetically sealed, B represents the lid and C shows one form of packing ring embodying this invention. In this form the cross section is triangular with one face at right angles to the surfaces of the rim and of the lid and the other two faces not in contact with these surfaces so that two edges of the ring are presented to the surfaces of the rim and of the lid. When the lid B is placed on the ring C, these edges are slightly deformed by the weight of the lid and the contact between the ring C and the adjoining surfaces is uniform and complete even before the difference of pressure is set up.

Referring to Fig. 2, rings C of triangular section may be cut from indiarubber tubes without any waste of material and in the same way rings $C^1$ having the form of a parallelogram in cross-section, or rings C² having a square cross-section with its diagonals disposed radially and axially, may similarly be cut from indiarubber tubes without any waste.

It is to be understood that the details of arrangement and construction may be varied without departing from this invention.

What I claim as my invention and desire to secure by Letters Patent is—

1. The combination of a vessel, a cover therefor and a ring of resilient or easily deformable elastic material between the vessel and the cover and presenting an attenuated edge to each surface with which it comes in contact.

2. The combination of a vessel having a mouth with a flat top edge, a flat lid therefor, and a ring of resilient or easily deformable elastic material which in cross section is wide in the middle and attenuated towards the points which contact with the flat surfaces.

3. The combination of a vessel with a flat rim, a cover therefor with a flat rim, and an indiarubber ring between them which in cross section is wide in the middle and attenuated towards the contact points.

4. The combination of a vessel with a flat rim, a cover therefor with a flat rim and an india-rubber ring between them of triangular cross section presenting an attenuated edge to the surface of each rim.

In testimony whereof I have signed my name to this specification in the presence of two witnesses.

CHRISTIAN HAMILTON GRAY.

Witnesses:
WM. JNO. TENNANT,
HARRY B. BRIDGE.